ROBERT J. ROMAN
INVENTOR.

ATTORNEYS

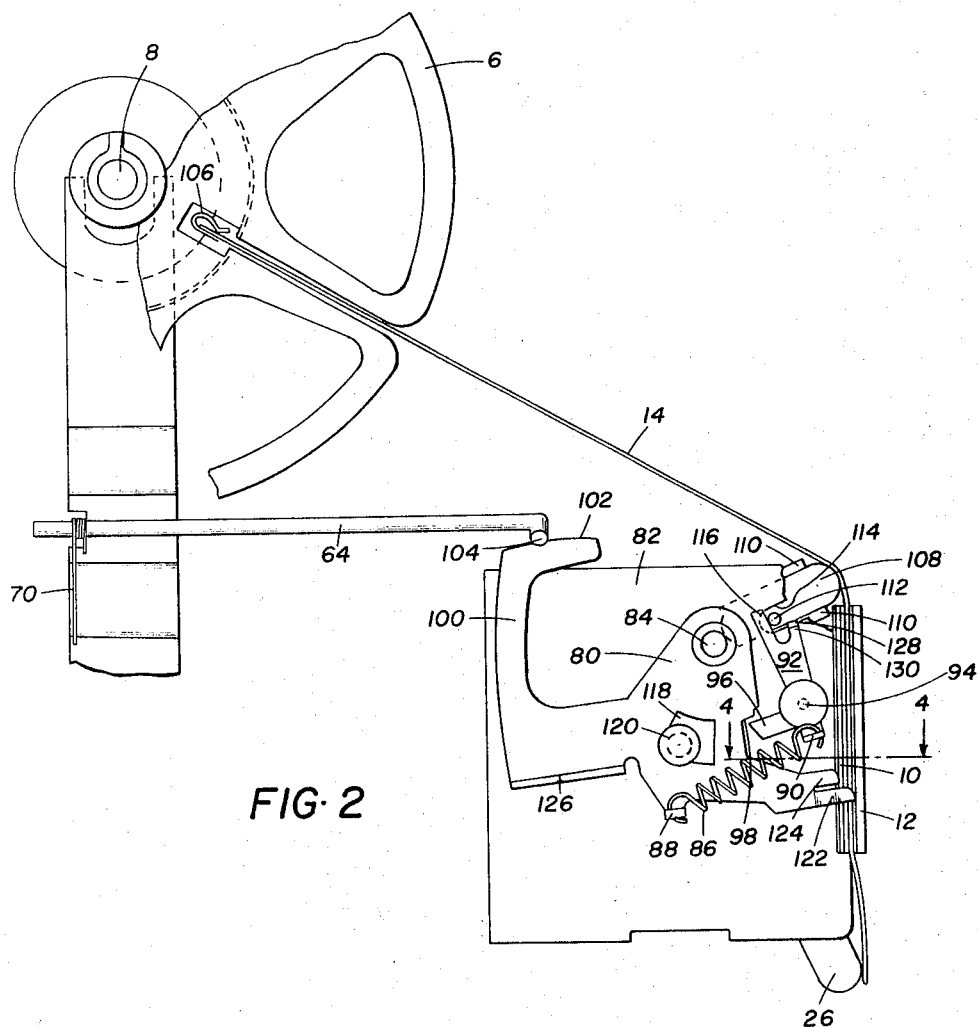

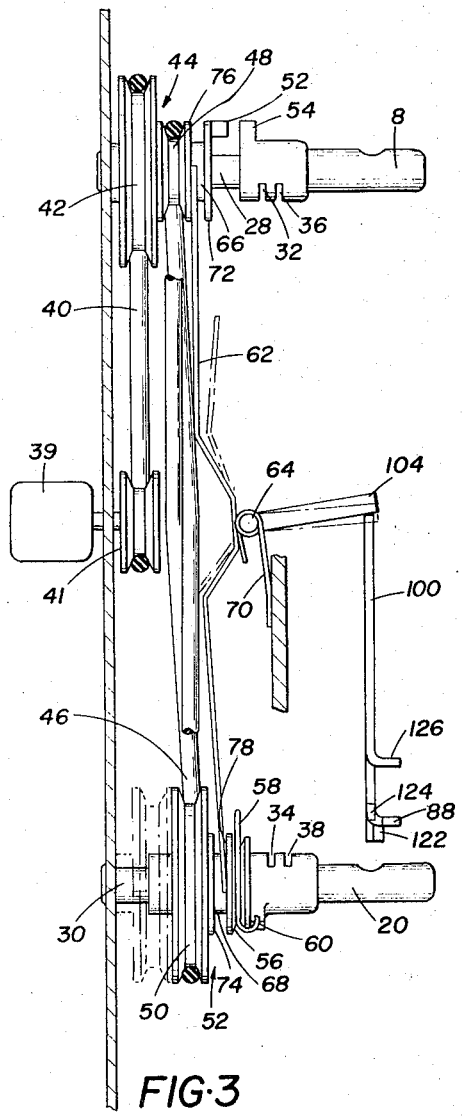

United States Patent Office 3,300,155
Patented Jan. 24, 1967

3,300,155
AUTOMATIC REWINDING MECHANISM FOR FILM OR THE LIKE
Robert J. Roman, Rochester, N.Y., assignor to Eastman Kodak Company, Rochester, N.Y., a corporation of New Jersey
Filed Sept. 18, 1964, Ser. No. 397,451
10 Claims. (Cl. 242—55.12)

This invention relates generally to rewinding apparatus, and more specifically to an automatic rewind mechanism for a motion picture projector the like.

In motion picture projectors or the like, the film is normally transported from the supply reel through an operating station such as an apertured film gate, and onto a take-up reel. In a motion picture projector, the apertured film gate is positioned along the optical axis of the projector, and a film pull down claw mechanism of known type is incorporated in the projector for intermittently advancing the film past the aperture one frame at a time for projecion. After the entire length of film has been projected and wound on the take-up reel, the operator normally manually connects the trailing end of the film to the supply reel, moves a lever to disconnect the drive system from the take-up reel and connect it to the supply reel, and operates the projector to rewind the projected film from the take-up reel onto the supply reel. Applicant's improved invention eliminates the manual rewinding operations involved in prior are motion picture projectors or the like, and provides an improved apparatus in which a web is transported therethrough in one direction for a specified operation, and after the operation has been completed, the web is automatically reversed in direction and rewound onto the supply reel.

Accordingly, one of the objects of the present invention is to provide an improved rewinding apparatus for automatically rewinding a web from a take-up reel onto the supply reel after the web has been subjected to an operation.

Another object of the invention is to provide an improved automatic rewind mechanism for a motion-picture projector or the like that is of simple design and construction, thoroughly reliable and efficient in operation, and economical to manufacture.

A more specific object of the invention is to provide an improved motion-picture projector having an automatic rewinding mechanism incorporated therein which, when actuated by film tension, automatically disengages the film from the transport claw, withdraws the pressure pad from the film, and disconnects the drive system from the take-up reel and connects it to the supply reel.

Another object of the invention is to provide an improved motion-picture projector having an automatic film rewinding mechanism incorporated therein in which the film transport mechanism and optical system is pivotal as a unit for vertically adjusting the projected image on the screen without adversely affecting the rewinding mechanism.

Objects and advantages other than those set forth above will be apparent from the following description when read in connection with the accompanying drawings, in which:

FIG. 2 is a segmental view similar to FIG. 1 showing the automatic rewind mechanism in a position for automatically rewinding the projected film onto the supply reel following the release thereof by the tensioned film;

FIG. 3 is a rear elevation view of FIG. 1 showing the clutching mechanism, with other portions of the projector omitted for purposes of clarity;

FIG. 4 is a segmental, enlarged view taken along line 4—4 of FIG. 2; and

FIG. 5 is a diagrammatic view, partially schematic, of an automatic rewinding mechanism incorporated in a motion picture projector or the like.

Figure 1:
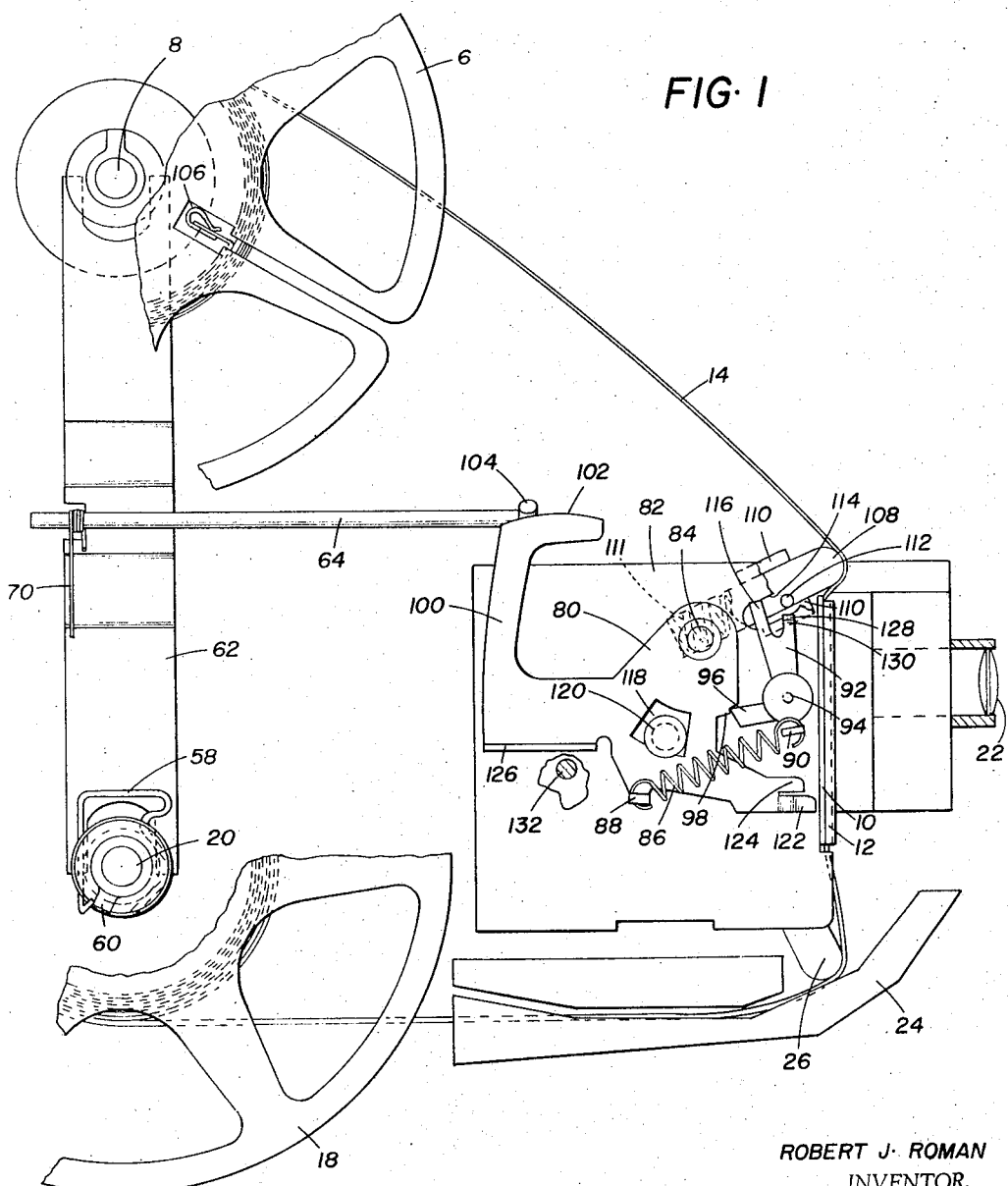
FIG. 1 is a side elevation view of a motion-picture projector having incorporated therein an automatic rewinding mechanism constructed in accordance with one embodiment of this invention, and showing the projector in its normal projecting position with portions thereof omitted for purposes of clarity.

Refering to the drawings, a preferred embodiment of an automatic rewinding mechanism according to the present invention is disclosed in a motion picture projector. The projector comprises a supply reel 6 mounted on a supply spindle 8, an operating station comprising an apertured film gate 10 and pressure pad 12 through which a film 14 is transported by an intermittent pull-down mechanism of known type of which only the claw 16 is shown in FIG. 4, and a take-up reel 18 mounted on a take-up spindle 20 and having a hub with teeth thereon, not shown, for automatically catching and winding the projected film thereon. As film 14 is intermittently advanced through apertured film gate 10 one frame at a time, it is projected by means of a lamp, not shown, and a lens 22. A film guide 24 is provided for guiding the projected film 14 leaving film gate 10 past a snubber 26 and between the flanges of take-up reel 18 where it is caught by the teeth on the take-up reel hub and automatically wound thereon.

The supply and take-up spindles 8, 20 are retained axially on respective shafts 28, 30 (see FIG. 3) by wire hairpin-shaped springs, not shown, which are inserted in slots 32, 34 and meet with grooves, not shown, in the respective shafts. Additional slots 36, 38 are provided for the use of additional wire springs for applying a slight friction drag to respective shafts 28, 30 and reels 6, 18 as required to improve smoothness of reel rotation.

The drive system for the projector (see FIG. 3) comprises a drive motor 39 and pulley 41 for driving a multigrooved drive pulley 44 rotatably mounted on supply shaft 28 by means of a belt 40 riding in a groove 42. Another belt 46 rides in a groove 48 in a drive pulley 44 and a groove 50 in a take-up pulley 52 which is rotatably mounted on take-up shaft 30 for driving the take-up pulley upon rotation of drive pulley 44. The drive pulley 44 further has a lug 52 thereon for engaging a shoulder 54 on supply spindle 8 when the drive pulley is axially moved to the right in FIG. 3 for clutching the drive pulley 44 to the supply spindle 8. The take-up pulley 52 has another groove 56 for receiving a clutch spring 58, the end of which in the clutched position engages a shoulder 60 on take-up spindle 20, as seen in FIGS. 1 and 3.

The shifting mechanism for selectively clutching the drive system to the supply and take-up spindles 8, 20 respectively comprises a clutch plate 62 secured at its midpoint to a rod 64 suitably mounted for rotation about its axis. The ends of plate 62 have notches therein for receiving respective cylindrical portions 66, 68 of respective pulleys 44, 52. A spring 70 having a portion thereof encircling rod 64, biases the rod and plate 62 in a clockwise direction causing one end thereof to engage a flange 72 of drive pulley 44 for urging it axially into driving engagement with supply spindle 8, and its opposite end to engage a flange 74 on take-up pulley 52 for moving it and clutch spring 58 axially out of driving engagement with take-up spindle 20. Movement of plate 62 in a counterclockwise direction against the bias of spring 70 by the automatic rewind mechanism to be explained hereinafter causes the ends of plate 62 to engage flanges 76, 78 respectively for axially urging the pulleys 44, 52 in the opposite directions clutching the drive system to the take-up spindle 20 and declutching the drive system from the supply spindle 8, as seen in full lines in FIG. 3.

The automatic rewind mechanism comprises a multi-armed lever 80 pivotally mounted on a pin 84 secured to a support plate 82, and biased in a counterclockwise direction by a spring 86 having one end connected to a lug 88 on lever 80 and its opposite end connected to a lug 90 on a latch lever 92. The latch lever 92 is pivotal about a pin 94, and has an arm 96 for engaging a shoulder 98 on lever 80 for releasably holding lever 80 in a cocked position as seen in FIG. 1. The lever 80 further has an arm 100 having an arcuate surface 102 engaging the underside of a radially extending end 104 of the aforementioned rod 64 for holding same against the bias of spring 70.

The hub of supply reel 6 has a clip 106 to which the tail end of film 14 is secured. Accordingly, when all of the film has been projected, the tension applied to film 14 by the film transport mechanism slidably urges a snubber 108, which is guided for reciprocal movement by a pair of spaced apart ways 110 against the bias of a spring 111. Movement of snubber 108 causes a pin 112 thereon extending through a slot 114 in support plate 82 to engage an arm 116 of latch lever 92 and urge the latch lever in a counterclockwise direction against the bias of spring 86. When the film tension exceeds the force exerted by springs 86, 111, the latch lever 92 is pivotally moved, withdrawing arm 96 from shoulder 98 to release cocked lever 80. The lever 80 is pivoted by spring 86 in a counterclockwise direction until the end of a slot 118 therein engages a headed stop lug 120 as seen in FIG. 2. The lever 80 in pivoting to this position causes two projections 122, 124, of unequal length at the end of one of its arms to respectively engage pressure pad 12 and apertured plate 10 for moving the two into their withdrawn position shown in FIG. 4. In this position, the film 14 has been disengaged from claw 16 by plate 10, and pressure pad 12 is clear of the film 14 so that it is free of any pressure in the film gate. Also, pivotal movement of lever 80 causes surface 102 of arm 100 to move downwardly from its FIG. 1 position to its FIG. 2 position. This allows spring 70 to urge rod 64 and clutch plate 62 in a clockwise direction as seen best in FIGS. 2 and 3 for declutching the drive system from the take-up spindle 20 and clutching it to the supply spindle 8. Accordingly, the projected film 14 is automatically rewound onto the supply reel 6. Upon completion of the rewind cycle, lever 80 is manually pivoted by finger pressure on a lug 126 in a clockwise direction moving the lever to its cocked position for normal projection.

The projector may be stopped at any point in its rewind cycle by turning off the power to the drive system by means of any suitable switch S (see FIG. 5), manually braking the take-up reel 18 to prevent it from over-running, recocking lever 80 as described heretofore, and closing switch S to energize drive motor 39 for driving the claw 16 of the film transport mechanism for transporting the film 14 in a forward direction through the operating station for projection, and to drive the take-up spindle 20 to wind up the projected film. Also, the rewind cycle can be initiated at any time during forward projection by manually pivoting latch lever 92 in a counterclockwise direction by finger pressure exerted on an outwardly projecting lug 128 at the end of an arm 130 of lever 92.

The film pull-down mechanism and lens 22 are mounted by any suitable means on plate 82 which is pivotal by any suitable mechanism about pivot 132 (see FIG. 1) to permit vertical adjustment of the projected image on a screen. The upper surface of arm 102 in its cocked position has a constant radius whose center is also the center of pivot 132. Accordingly, it is possible to pivot plate 82 to vary the vertical position of the projected image without affecting the clutching mechanism.

The invention has been described in detail with particular reference to a preferred embodiment thereof, but it will be understood that variations and modifications can be effected within the spirit and scope of the invention as described hereinabove and as defined in the appended claims.

I claim:

1. In a mechanism for automatically rewinding a web after it has been transported in one direction by intermittent film pull-down means through a motion picture projector or the like having supply and take-up reels, the combination comprising:
   an operating station for said web;
   drive means for driving said film pull-down means for transporting said web through said operating station in one direction, and for selectively driving one of said supply and take-up reels;
   shifting means movable between a normal forward position in which it couples said drive means to said take-up reel to wind up said web thereon as said web is transported through said operating station in said one direction, and a reverse position in which it couples said drive means to said supply reel for rewinding said web thereon, and
   control means for moving said shifting means between its forward and reverse positions, said control means including a spring, and a latch for releasably holding said shifting means in its normal forward position against the bias of said spring, and in response to said web after it has completed its travel in said one direction for releasing said shifting means for movement by said control means to its reverse position for automatically rewinding said web onto said supply reel.

2. In a mechanism for automatically rewinding a web after it has been transported in one direction by intermittent film pull-down means through a motion picture projector or the like having supply and take-up reels, the combination comprising:
   an operating station for said web comprising an apertured plate and a pressure plate between which said web is transported;
   drive means for driving said film pull-down means for transporting said web through said operating station in one direction, and for selectively driving one of said supply and take-up reels;
   shifting means movable between a normal forward position, in which it couples said drive means to said take-up reel to wind up said web thereon as said web is transported through said operating station in said one direction, and a reverse position, in which it couples said drive means to said supply reel for rewinding said web thereon, and
   control means for moving said shifting means between its forward and reverse positions, said control means including a spring, a pivotal lever biased by said spring, and a latch for holding said pivotal lever against the bias of said spring, said pivotal lever being movable between a latched position in which said control means releasably holds said shifting means in its normal forward position against the bias of said spring when said web is transported in said one direction, and an unlatched position in response to said web after it has completed its travel in said one direction whereby said shifting means is moved by said spring to its reverse position for automatically rewinding sad web onto said supply reel;
   said pivotal lever having a pair of projections, each of which engages one of said apertured and pressure plates when said lever is released by said latch, and which move the plates in a direction to disengage said film pull-down means from said web and to remove any pressure on said web.

3. In a mechanism for automatically rewinding a web after it has been transported in one direction by intermittent film pull-down means through a motion picture projector or the like having supply and take-up reels, the combination comprising:
   an operating station for said web;

drive means for driving said film pull-down means for transporting said web through said operating station in one direction, and for selectively driving one of said supply and take-up reels;

shifting means movable between a normal forward position, in which it couples said drive means to said take-up reel to wind up said web thereon as said web is transported through said operating station in said one direction, and a reverse position, in which it couples said drive means to said supply reel for rewinding said web thereon, said shifting means further comprising a first spring, a rotatable rod biased by said first spring and having a radially extending end, and a clutch plate mounted on said rotatable rod for selectively connecting said drive means to one or the other of said supply and take-up reels; and control means for moving said shifting means between its forward and reverse positions, said control means including a pivotal lever having an arm in engagement with said rod end and biased by said first spring, and a latch for holding said pivotal lever against the bias of said first spring, said pivotal lever being movable between a latched position for releasably holding said shifting means in its normal forward position against the bias of said first spring when said web is transported in said one direction, and an unlatched position in response to said web after it has completed its travel in said one direction whereby said shifting means is moved by said control means to its reverse position for automatically rewinding said web onto said supply reel.

4. The invention according to claim 3 wherein said latch is operatively connected to said pivotal lever, and said pivotal lever is movable between latched and unlatched positions, and is biased by said first spring and a second spring into said unlatched position in which said shiftng means is held in its reverse position, said pivotal lever further being manually movable into said latched position against the bias of said first and second springs.

5. The invention according to claim 4 wherein said operating station comprises an apertured plate and a pressure plate between which said web is transported, and said pivotal lever has a pair of projections which engage said plates when said lever is released by said latch, and moves same in a direction to disengage said drive means from said web and to remove any pressure on said web.

6. The invention according to claim 5 wherein said latch is releasable by a reciprocally movable member biased by a third spring into engagement with said web movable along one path, said web when subjected to a tension in excess of said third spring being movable along a different path in which it moves said member to release said latch for movement of said pivotal lever to its unlatched position.

7. The invention according to claim 6 wherein the trailing end of said web is secured to said supply reel whereby when the end of said web is reached, said web is subjected to a tension by said drive means sufficient to overcome the bias of said third spring to move said member and release said latch for moving said shifting means to its reverse position for rewinding said web onto the supply reel.

8. The invention according to claim 3 wherein said operating station comprises an apertured plate and a pressure plate between which said web is transported, and wherein said control means comprises a second spring for biasing said pivotal lever into said unlatched position, said pivotal lever being manually movable into said latched position against the bias of said first and second springs, said pivotal lever further having a pair of projections, each of which engages one of said apertured and pressure plates when said lever is released by said latch, and which move said plates in a direction to disengage said film pull-down means from said web and to remove any pressure on said web.

9. The invention according to claim 3 wherein said operating station comprises an apertured plate and a pressure plate between which said web is transported, and wherein said control means comprises a second spring for biasing said pivotal lever into said unlatched position, said pivotal lever being manually movable into said latched position against the bias of said first and second springs, said pivotal lever further having a pair of projections, each of which engage one of said apertured and pressure plates when said lever is released by said latch, and which move said plates in a direction to disengage said drive means from said web and to remove any pressure on said web, said control means further including a third spring, and a reciprocally movable member for releasing said latch and biased by said third spring into engagement with said web movable along one path, said web when subjected to a tension in excess of said third spring being movable into a different path in which it moves said member to release said latch for movement of said pivotal lever to its unlatched position.

10. The invention according to claim 3 wherein said operating station comprises an apertured plate and a pressure plate between which said web is transported, and wherein said control means comprises a second spring for biasing said pivotal lever into said unlatched position, said pivotal lever being manually movable into said latched position against the bias of said first and second springs, said pivotal lever further having a pair of projections, each of which engages one of said apertured and pressure plates when said lever is released by said latch, and which move said plates in a direction to disengage said film pull-down means from said web and to remove any pressure on said web, said control means further including a third spring, and a reciprocally movable member for releasing said latch and biased by said third spring into engagement with said web movable along one path, said web having its trailing end secured to said supply reel whereby when the end of said web is reached, said web is subjected to a tension in excess of said third spring and is moved into a different path in which it moves said member, releasing said latch for movement of said pivotal lever to its unlatched position, and said shifting means to its reverse position for rewinding said web onto the supply reel.

References Cited by the Examiner

UNITED STATES PATENTS 1,310,689 7/1919 Carpenter _____ 40—93 X
3,003,710 10/1961 Shiver et al. _____ 242—55.12

FRANK J. COHEN, *Primary Examiner.*

LEONARD D. CHRISTIAN, *Examiner.*

Disclaimer 3,300,155.—*Robert J. Roman*, Rochester, N.Y. AUTOMATIC REWINDING MECHANISM FOR FILM OR THE LIKE. Patent dated Jan. 24, 1967. Disclaimer filed Nov. 5, 1969, by the assignee, *Eastman Kodak Company*.

Hereby enters this disclaimer to claim 1 of said patent.

[*Official Gazette December 16, 1969.*]